K. E. PEILER.
GUM STRAINER.
APPLICATION FILED SEPT. 8, 1916.

1,296,112.

Patented Mar. 4, 1919.
2 SHEETS—SHEET 1.

Inventor:
Karl E. Peiler
by Harry P. Williams
Atty.

K. E. PEILER.
GUM STRAINER.
APPLICATION FILED SEPT. 8, 1916.

1,296,112.

Patented Mar. 4, 1919.
2 SHEETS—SHEET 2.

Inventor:
Karl E. Peiler
By Harry R. Williams
Att'y.

UNITED STATES PATENT OFFICE.

KARL E. PEILER, OF HARTFORD, CONNECTICUT, ASSIGNOR OF ONE-NINTH TO HIMSELF, TWO-NINTHS TO WILLIAM A. LORENZ, OF HARTFORD, CONNECTICUT, AND SIX-NINTHS TO BEECH-NUT PACKING COMPANY, OF CANAJOHARIE, NEW YORK, A CORPORATION OF NEW YORK.

GUM-STRAINER.

1,296,112.           Specification of Letters Patent.         Patented Mar. 4, 1919.

Application filed September 8, 1916. Serial No. 119,034.

*To all whom it may concern:*

Be it known that I, KARL E. PEILER, a citizen of the United States, residing at Hartford, in the county of Hartford and State of Connecticut, have invented a new and useful Improvement in Gum-Strainers, of which the following is a specification.

This invention relates to the straining of molten gum.

The object of the invention is to provide a simple machine which will continuously, rapidly and efficiently remove deleterious solid particles of matter from molten gum. The invention is particularly useful in the treatment of chicle which is being prepared for chewing gum. Chicle in its raw commercial state contains more or less bark and other undesirable substances from which it must be freed and in order to permit the separation of such objectionable matter the chicle is generally melted. Chicle, however, cannot be heated for this purpose so hot as to reduce it to a perfect liquid, as the heat necessary to accomplish this would destroy the valuable qualities of the gum. The gum, therefore, has to be treated for the removal of the foreign matter at such a temperature that it is only semi-fluid or viscous, and the machine illustrated and described herein is for acting upon the gum in such condition.

Figure 1:
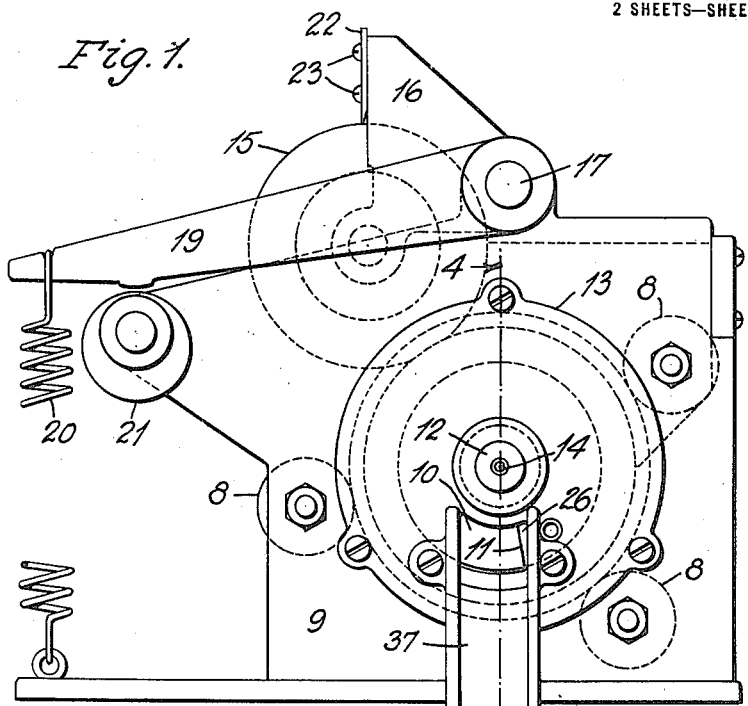
Figure 2:
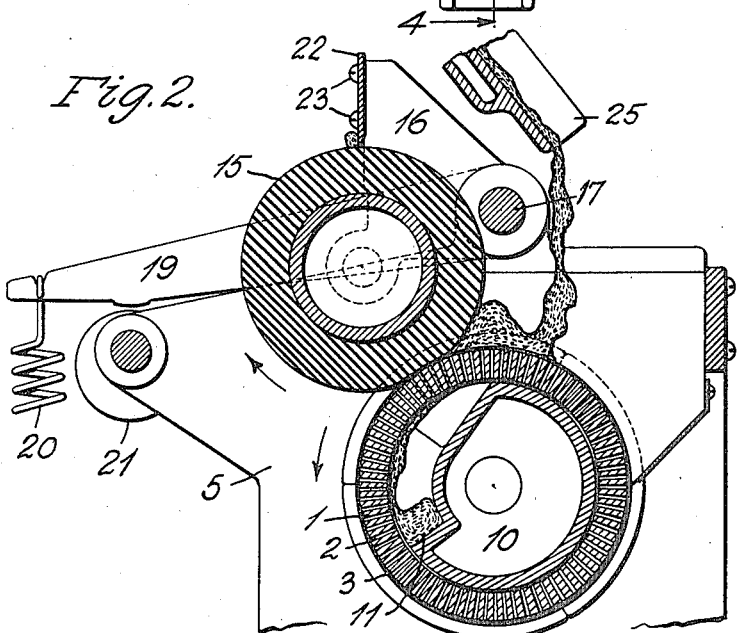
Figure 3:
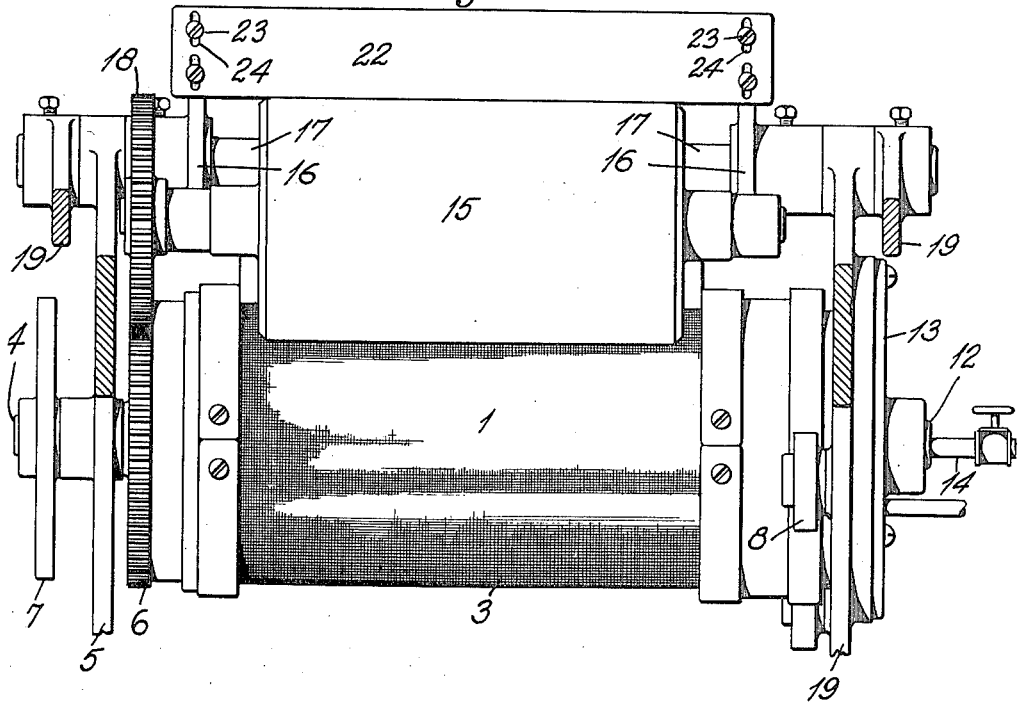
Figure 4:
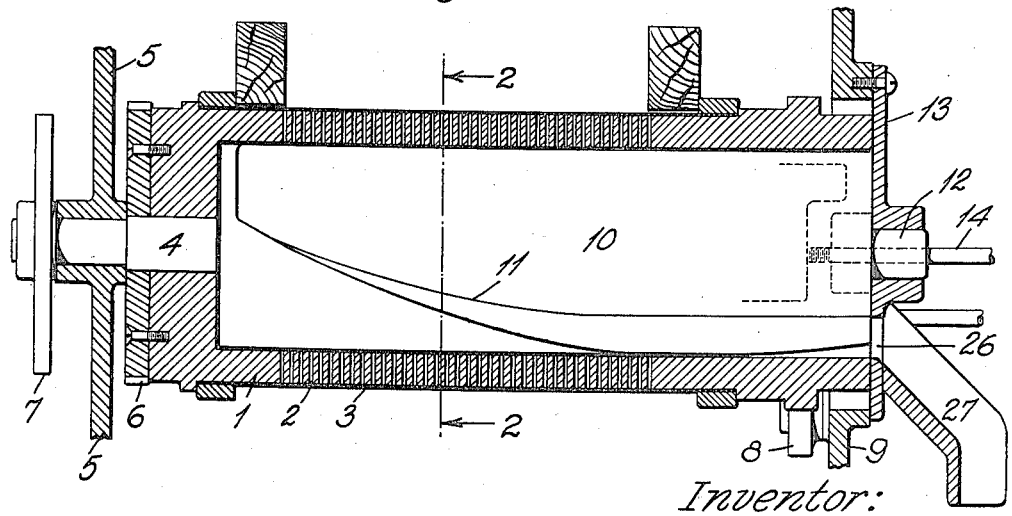

Figure 1 of the accompanying drawings shows a side elevation of a simple form of machine which embodies the invention. Fig. 2 shows a vertical section of the same on the plane indicated by the dotted line 2—2 on Fig. 4. Fig. 3 shows a rear elevation of the machine. Fig. 4 is a longitudinal section of the straining cylinder showing the gum removing scraper therein on the plane indicated by the dotted line 4—4 on Fig. 1.

The straining cylinder 1 has one end closed and the other end open. The peripheral wall of this cylinder is perforated with small holes 2 and is covered on the outside with a screen 3 of very fine mesh. At the closed end the cylinder has a shaft 4 that is mounted in bearings supported by one of the side walls 5 of the frame, and on this shaft is a gear 6 and driving means 7, which may be a pulley or a gear as is most convenient. At the open end the cylinder is supported by rolls 8 mounted on the inside of the side wall 9 of the frame.

In the interior of the cylinder and held fixed is a scraper 10. This scraper is hollow and its operating edge 11, which is close to the inner wall of the cylinder, is shaped so as to extend spirally with relation to the axis of the cylinder. At the outer end the scraper has a hub 12 that is fastened in the plate 13 which is secured to the side wall 9 of the frame. Extending through this hub is a pipe 14 by means of which steam may be admitted into the scraper for keeping it hot and warming the cylinder.

Above and designed to rest upon the cylinder is a rubber covered roller 15. The arbors of this roller are mounted in bearings in arms 16 that are fastened to the shaft 17 which is held in bearings in the side wall of the frame. One of the arbors of the roller is provided with a gear 18 that meshes with the gear 6 attached to the cylinder so that the roller may be rotated with the cylinder but in an opposite direction.

Fastened to and extending from the shaft 17 are levers 19. The outer ends of these levers are drawn downwardly by springs 20, and beneath these ends of the levers are cams 21 which are intended to be adjusted so as to exactly fix the position of the levers and consequently determine the amount of pressure of the rubber roller against the cylinder. These means also allow the roller to yield should any large substance attempt to pass between the cylinder and the roller, and thus prevent injury to the mechanism. Above the rubber roller is a scraper 22. This scraper is fastened to the edges of the arms 16 by screws 23 that pass through slots 24 in the scraper into the arms so that the active edge of the scraper may be readily adjusted with relation to the surface of the rubber roller.

In the operation of this machine the molten chicle containing the foreign matter flows in a continuous viscous stream from the chute 25 down onto the surface of the rotating cylinder and is carried thereby in under the rubber roller, the pressure of which squeezes the gum through the screen and perforations into the interior of the cylinder. From the interior of the cylinder this gum is gathered by the spiral scraper and caused to flow out of the open end of the cylinder through the hole 26 in the plate 13 to the discharge spout 27, the cylinder and the scraper being heated to the required degree to facilitate this flow of the gum without heating it too hot. The impurities in the gum are not forced through the screen into the cylinder, but are picked up by the comparatively cold and more sticky yielding surface of the rubber roller and carried thereby until they are collected from the surface of the roller by the scraper 22 at the top.

The invention claimed is;

1. A machine for straining molten gum having a hollow cylinder with a perforated peripheral wall, a screen covering the peripheral surface of the cylinder, mechanism for rotating the screen-covered cylinder, a scraper fixed in and bearing against the inner wall of the cylinder for removing the molten gum therefrom, a roller with an elastic surface bearing against the screen-covered surface of the cylinder for picking the solid impurities from the gum and forcing the purified gum through the screen and perforations of the cylinder, mechanism for rotating said roller, and means for cleaning the impurities picked from the gum from the surface of said roller.

2. A machine for straining molten gum having a hollow cylinder with one end closed and one end open and with a perforated peripheral wall, a screen covering the peripheral surface of the cylinder, mechanism for rotating the screen-covered cylinder, a fixed scraper projecting into the cylinder from the open end thereof against the inner wall for removing the molten gum therefrom, a roller with an elastic surface bearing against the screen-covered surface of the cylinder for picking the solid impurities from the gum and forcing the purified gum through the screen and perforations of the cylinder, mechanism for rotating said roller, and means for cleaning the impurities picked from the gum from the surface of said roller.

3. A machine for straining molten gum having a hollow cylinder with a perforated peripheral wall, a screen covering the peripheral surface of the cylinder, mechanism for rotating the screen-covered cylinder, a scraper with a spiral scraping edge fixed in and bearing against the inner wall of the cylinder for removing the molten gum therefrom, a roller with an elastic surface bearing against the screen-covered surface of the cylinder for picking the solid impurities therefrom and forcing the purified gum through the screen and perforations of the cylinder, mechanism for rotating said roller, and means for cleaning the impurities from the gum from the surface of said roller.

4. A machine for straining molten gum having a hollow cylinder with a perforated peripheral wall, a screen covering the peripheral surface of the cylinder, mechanism for rotating the screen-covered cylinder, a scraper fixed in and bearing against the inner wall of the cylinder for removing the molten gum therefrom, means for heating the scraper and keeping the gum molten, a roller with an elastic surface bearing against the screen-covered surface of the cylinder for picking the solid impurities from the gum and forcing the purified gum through the screen and perforations of the cylinder, mechanism for rotating said roller, and means for cleaning the impurities picked from the gum from the surface of said roller.

5. A machine for straining molten gum having a hollow cylinder with a perforated peripheral wall, a screen covering the peripheral surface of the cylinder, mechanism for rotating the screen-covered cylinder, a scraper fixed in and bearing against the inner wall of the cylinder for removing the molten gum therefrom, an oscillatory and rotary roller with an elastic surface bearing against the screen-covered surface of the cylinder for picking the solid impurities from the gum and forcing the purified gum through the screen and the perforations of the cylinder, mechanism for oscillating the roller toward or from the cylinder and adjusting the pressure of the roller against the cylinder, mechanism for rotating said roller, and means for cleaning the impurities picked from the gum from the surface of said roller.

6. A machine for straining molten gum having a hollow cylinder with one end closed and one end open and with a perforated peripheral wall, a screen covering the peripheral surface of the cylinder, mechanism for rotating the screen-covered cylinder, a fixed scraper with a spiral scraping edge projecting through the open end into the cylinder and bearing against the inner wall thereof for removing the molten gum therefrom, a roller with an elastic surface bearing against the screen-covered surface of the cylinder for picking the solid impurities from the gum and forcing the purified gum through the screen and perforations of the cylinder, mechanism for rotating said roller, and means for cleaning the impurities picked from the gum from the surface of said roller.

7. A machine for straining molten gum having a hollow cylinder with a perforated peripheral wall, a screen covering the peripheral surface of the cylinder, mechanism for rotating the screen-covered cylinder, a scraper fixed in and bearing against the inner wall of the cylinder for removing the molten gum therefrom, means for heating the scraper and the cylinder and keeping the gum molten, a relatively cooler rubber roller bearing against the screen-covered surface of the cylinder for picking the solid impurities from the gum and forcing the purified gum through the screen and perforations of the cylinder, and mechanism for rotating said roller.

8. A machine for straining molten gum having a hollow cylinder with one end closed and one end open and with a perforated peripheral wall, a screen covering the peripheral surface of the cylinder, mechanism for rotating the screen-covered cylinder, a fixed scraper with a spiral scraping edge projecting through the open end into the cylinder and bearing against the inner wall thereof for removing the molten gum therefrom, a rubber covered roller bearing against the screen-covered surface of the cylinder for picking the solid impurities from the gum and forcing the purified gum through the screen and perforations of the cylinder, means for adjusting the pressure of the roller against the cylinder, mechanism for rotating said roller, and a scraper adjustably held adjacent to the surface of the roller for removing therefrom the impurities picked thereby from the gum.

9. A machine for straining molten gum having a hollow perforated cylinder with a screen-covered periphery, mechanism for rotating the cylinder, a scraper within the cylinder for removing the molten gum from the inner wall thereof, means for heating the scraper and cylinder and keeping the gum molten, a relatively cooler roller with an elastic surface bearing against the screen-covered surface of the cylinder for picking the solid impurities from the molten gum and forcing the purified gum through the screen-covered cylinder, and mechanism for rotating said roller.

10. A machine for straining molten gum having a hollow perforated cylinder with a screen-covered periphery, mechanism for rotating the cylinder, a fixed hollow scraper with a spiral scraping edge projecting into the cylinder from one end thereof and bearing against the inner wall for removing molten gum therefrom, means for heating the scraper and the cylinder and keeping the gum molten, and means for picking solid particles out from the melted gum and simultaneously forcing the fluid gum through the screen-covered walls of the cylinder.

11. A machine for straining molten gum having a perforated and screened surface, a roller with an elastic surface bearing against one side of said screened surface of the cylinder for simultaneously picking solid impurities from the gum and forcing the purified gum into the cylinder, a scraper bearing against the opposite side of said screened surface for removing the purified molten gum therefrom, means for heating said screened surface and scraper for keeping the gum molten, and mechanism for rotating said roller.

12. A machine for straining molten gum having a perforated and screened surface for receiving molten gum, mechanism for moving said gum receiving surface, means for heating said surface and keeping the gum molten, means having an elastic surface bearing against one side of said screened surface for picking solid impurities from the molten gum and forcing the purified gum therethrough, mechanism for moving said gum cleaning and forcing means, and means bearing against the opposite side of said screened surface for removing the cleaned molten gum forced therethrough by said cleaning and forcing means.

KARL E. PEILER.